April 18, 1961  S. T. CARTER  2,980,229
ARTICLE-DIVIDING CONVEYOR APPARATUS
Filed Jan. 15, 1960
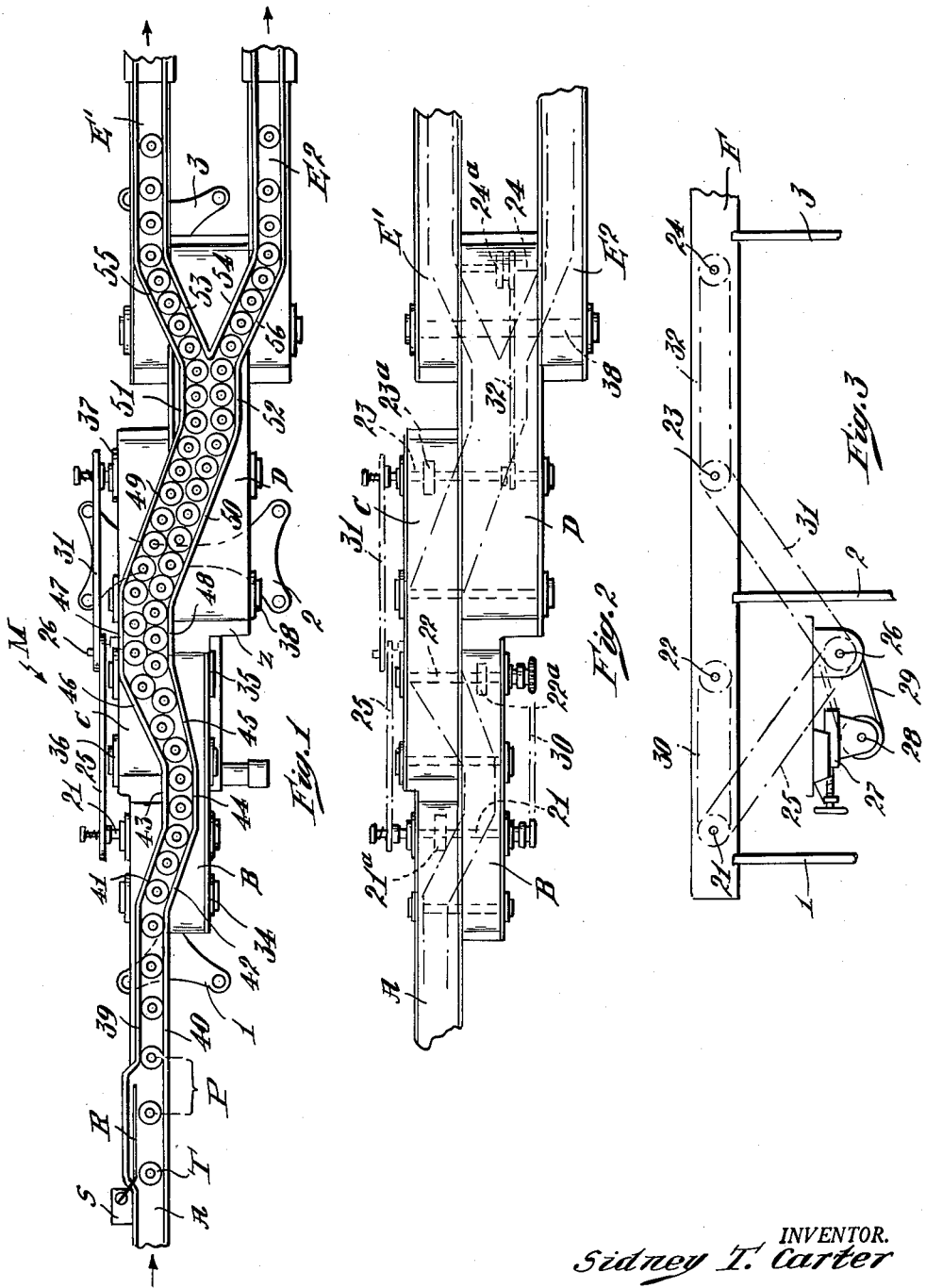
INVENTOR.
Sidney T. Carter
BY
Roberts Cushman & Graves
ATT'YS United States Patent Office 2,980,229
Patented Apr. 18, 1961

2,980,229

ARTICLE-DIVIDING CONVEYOR APPARATUS

Sidney T. Carter, Shrewsbury, Mass., assignor to Geo. J. Meyer Manufacturing Co., Cudahy, Wis., a corporation of Wisconsin Filed Jan. 15, 1960, Ser. No. 2,637

12 Claims. (Cl. 198—31)

This invention pertains to article-dividers, in particular to conveyor apparatus operative automatically to divide articles of advancing in a row, in single file, so that alternate articles are discharged into divergent paths, thus dividing them equally for delivery in equal numbers to two independent destinations, for instance to two processing machines.

As a particular example of a utility of such a divider it may be noted that a modern bottle-filling or capping machine has a capacity substantially greater than that of a pasteurizer of standard practical size so that in a bottling plant, running at full capacity, wherein the bottles are filled, capped and then delivered to pasteurizing apparatus, it is desirable and in fact usually necessary to divide the bottles delivered by the filling or capping machine into two separate groups for delivery to two respective pasteurizers.

An object of the present invention is to provide simple, relatively inexpensive and substantially foolproof apparatus operative automatically to divide bottles delivered, for example, by a bottle capping machine, so that an equal number of bottles will be delivered to each of two pasteurizers or other processing apparatus.

A further object of the invention is to provide an article-divider to which articles are normally advanced in a row in which the articles move in single file, and then to separate the articles so as to form two distinct rows, each comprising the same number of articles per unit of length, and wherein such division of the articles results from certain successive changes in their speed of advance accompanied by corresponding changes in the width of the article path.

A further object is to provide an article-divider to which articles are advanced at a predetermined uniform velocity while spaced apart a uniform predetermined distance and while moving in a row in single file, and in which, by appropriately arranged rigid guides and successive reductions in the speed of advance of the articles, alternate articles of the original row are arranged to form two distinct rows.

A further object is to provide an article-divider which is automatic and continuous in operation and which is operative, without affecting the rate at which articles are received from a source of supply, to divide the articles equally and to deliver them in the form of two distinct single file rows.

A further object is to provide an article-divider capable of dividing articles equally and without interrupting or modifying the rate at which they are received from a supply, and of delivering half of said articles into each of two independent paths and which is adjustable to handle articles of different diameters.

Other and further objects and advantages of the invention will be pointed out in the following more detailed description and by reference to the accompanying drawings, wherein:

Fig. 1 is a fragmentary more or less diagrammatic plan view of a divider embodying the present invention, illustrating the division of bottles, received on a single row, into two separate rows;

Fig. 2 is a diagrammatic plan view of the divider, omitting the bottles; and

Fig. 3 is a diagrammatic elevation indicating the drive connections.

Referring to the drawings, wherein the apparatus is illustrated more or less diagrammatically, the numerals 1, 2 and 3 designate supports of any desired type upon which is mounted a frame F of any desired construction and such as may be conventional in the conveyor art, and which supports bearings for parallel, horizontal shafts 21, 22, 23 and 24, respectively. The shaft 21 is driven by a sprocket chain 25 passing over a sprocket wheel on the shaft 21 and about a sprocket wheel on the shaft 26 of a speed varying mechanism (Fig. 3), which may be of conventional type, but which, as herein illustrated, comprises a horizontally adjustable carriage 27 for a drive motor whose shaft 28 carries one of the pulleys of a so-called Reeves drive, including a belt 29 which passes about a pulley on the shaft 26. Adjustment of the carriage 27 varies the speed of the shaft 26 in well-known manner. A sprocket chain 30 (Fig. 3), passing about a sprocket wheel on the shaft 21 and about a sprocket wheel on the shaft 22, drives the latter in the same direction as the shaft 21.

A sprocket chain 31 (Fig. 3), which embraces a sprocket wheel on the shaft 26, and also a sprocket wheel on the shaft 23, drives the latter shaft, which, in turn, by means of a sprocket chain 32 drives the shaft 24.

A conveyor A, which may be of any desired type, for example a sprocket chain carrying a series of independent metal plates such as is customarily employed in conveyors for bottles or like articles, is arranged to receive articles, such as articles T, for example bottles, from a suitable source of supply, for instance, a bottle capping machine. This chain passes about a sprocket wheel 21a on the shaft 21, whereby the conveyor is driven at a substantially constant speed, the speed being such as to space successive articles T a uniform distance apart, for example, the distance P as indicated in Fig. 1.

A second conveyor B is arranged to have its article supporting run in the same plane as the article supporting run of the conveyor A, and so that its receiving end portion is closely adjacent to the delivery end portion of the conveyor A. This conveyor B passes about suitable guide rolls or the like and is driven by a sprocket wheel 22a on the shaft 22. A third conveyor C is arranged with its article conveying run in the same plane as that of the conveyor B and with its receiving end portion closely adjacent to the delivery end portion of the conveyor B. This conveyor C passes around suitable guides and is driven by a sprocket wheel 23a on the shaft 23. A fourth conveyor D, having its article conveying run in the same plane as that of the conveyor C, is arranged so that its receiving end is closely adjacent to the delivery end portion of the conveyor C. This conveyor D passes about suitable guides or sprockets and is driven by a sprocket wheel 24a on the shaft 24.

Two parallel conveyors $E^1$ and $E^2$ are arranged with their receiving end portions, one at each side respectively of the delivery end portion of the conveyor D. These conveyors $E^1$ and $E^2$ have their article conveying runs in the same plane as that of the conveyor D and pass about suitable guides, and are driven by the mechanisms of the machines to which the articles are to be delivered by the respective conveyors $E^1$ and $E^2$, such machines, for example, being pasteurizers, not here shown. The conveyors A, B, $E^1$ and $E^2$ may, for example, be of a width approximating the diameter of the article, for example, the bottle which is to be handled by the apparatus, while the conveyor C is somewhat wider, and the conveyor D is approximately twice the width of the conveyor A.

Near the receiving end of the conveyor A, a switch S is desirably arranged, this switch having an actuating arm R which contacts the articles T as they move along the conevyor path. Such a switch, with its actuator arm, is desirable as a means for stopping the article-dividing apparatus or for actuating a signal in the event that the supply of articles ceases.

Suitable guide rails are arranged for guiding the articles as they move along from one conveyor to the next, these guide rails being mounted on the frame in conventional manner, so that they may be adjusted toward or from each other to accommodate articles of different sizes. The adjusting means being conventional in the art is not here illustrated.

As shown in Fig. 1, such parallel guide rails 39 and 40 extend along the receiving portion of the conveyor A, these rails being spaced apart a distance approximating the diameter of the articles T, hereinafter for convenience, referred to as bottles. Near the receiving end of the conveyor B, the guide rails 39 and 40, which are parallel to the conveyor A, are succeeded by rails 41 and 42, which extend diagonally of the conveyors A and B so as to divert articles from the conveyor A onto the conveyor B. As hereinafter more fully described, the speed of the conveyor B is such, relatively to that of the conveyor A, that as the bottles are transferred from the conveyor A to the conveyor B, the space between adjacent bottles is decreased so that eventually the adjacent bottles may be in actual contact or spaced apart but a short distance, for example, a distance of the order of ¼ of an inch. The diagonal rails 41 and 42 are succeeded by guide rails 43 and 44 which are parallel to the direction of motion of the conveyor B, but these latter rails only extend substantially to the point where the conveyor C begins and are then succeeded by the guide rails 45 and 46 which extend diagonally of the conveyors B and C. These guide rails 45 and 46 gradually diverge from each other, thus increasing the width of the path between them until, when the bottles are wholly supported on the conveyor C, there is sufficient space to permit the bottles to assume a staggered relation in which alternate bottles contact the guide rails 45 and 46, respectively. The guide rails 45 and 46 are then succeeded by guide rails 47 and 48 which extend parallel to the direction of motion of the conveyor C, and which are spaced apart a distance approximating twice the diameter of the bottle. These guide rails 47 and 48 are then followed, beginning at approximately the point where the conveyor D became effective by guide rails 49 and 50, which are so spaced apart as to permit the bottles to move along in two distinct parallel rows, in which adjacent bottles in each row are in substantial contact. The rails 49 and 50 extend diagonally across the conveyors C and D and thus divert the bottles from the conveyor C to the conveyor D. Where the bottles begin to move in two distinct rows parallel to the direction of motion of conveyor D, the rails 49 and 50 are succeeded by the rails 51 and 52, which are parallel to the direction of motion of the conveyor D.

Overlying the delivery end portion of the conveyor D, there is a triangular divider comprising the guide rails 53 and 54 which intersect at an acute angle directed toward the oncoming rows of bottles, and with its apex midway between the guide rails 51 and 52. Cooperating with these guide rails 53 and 54 of the divider are guide rails 55 and 56 thereby to define divergent paths for the two rows of bottles, whereby the bottles of the two rows, respectively, are delivered onto the conveyors $E^1$ and $E^2$.

The speed of the conveyor A may be adjusted to suit the output of the supply machine, for example, a filling machine or capping machine, by means of the Reeves drive comprising the movable motor carriage 27. The relative speeds of the conveyors A and B may be adjusted by suitably selecting the sizes of the sprocket wheels on the shafts 21 and 22. The relative speed of the conveyor D with reference to the speed of the conveyor C may be fixed by proper selection of the sprocket wheel on the shaft 23, as compared with that on the shaft 26, whereby the chain 31 is driven, while the relative speeds of the conveyors D and C may be fixed by selection of the sprocket wheels on the shafts 23 and 24 over which the chain 32 passes.

As above suggested, the bottles T, as they arrive on the conveyor A, will usually be spaced apart a uniform distance as the result of the operation of the discharge star wheel of the supply apparatus. As the bottles cross over from the conveyor A to the conveyor B, the lesser speed of the conveyor B is such as to cause the bottles to come more nearly together or actually to contact. The relative speeds of the conveyors B and C are such that as the bottles enter the space between the diverging guide rails 45 and 46 they tend to crowd each other in opposite directions to start a double row, while the relative speed of the conveyors C and D is such as further to slow down the bottles and thus to induce them so to occupy the space between the guide rails 49 and 50 as to form two parallel rows.

More specifically, if the diameter of the bottle which is being handled be represented by the character $D^2$, and the character $K^2$ represents the number of articles per minute, and the character $P^2$ represents the spacing between adjacent articles, then the speed of the conveyor A would be represented by the expression $D^2K^2P^2$, while the speed of the conveyor B may be represented by the expression $D^2K^2$, where the spacing has become zero, or by the alternative expression $P^2K^2$ (¼ of an inch) where the bottles are spaced ¼ of an inch apart. The speed of the conveyor C may then be represented by the expression ¾ $D^2K^2$, while the speed of the conveyor D may be represented by the expression ½ $D^2K^2$, with the understanding that the bottles are in actual contact as they are moved along by the conveyor C. Since it is desirable that the bottles be spaced apart to some extent as they are moved along by the conveyors $E^1$ and $E^2$ toward the next processing apparatus, the speed of the conveyors $E^1$ and $E^2$ may, for example, be represented by the expression 0.6 $D^2K^2P^2$ where the character $P^2$ represents a spacing somewhat greater than zero. Merely by way of example, it has been found in a given instance that the following speeds give desirable results: 160 feet per minute for the conveyor A; 114.5 feet per minute for the conveyor B; 86 feet per minute for the conveyor C; 57.25 feet per minute for the conveyor D; and 68 feet per minute for the conveyors $E^1$ and $E^2$.

It will be understood that the above specific relative speeds are merely by way of example and represent results which have been found effective under certain circumstances, but that the invention is not necessarily limited to such relative speeds or to any such absolute velocities as above instanced.

While one desirable embodiment of the invention has herein been illustrated and described by way of example, it is to be understood that the invention is broadly inclusive of any and all modifications falling within the scope of the appended claims.

I claim:

1. An article-divider operative to divide articles which are advanced in single file at a constant linear velocity into its field of action, in a row in which the articles are uniformly spaced apart, said apparatus comprising normally fixed guides which define a path for the articles, and a plurality of successive conveyors designed to move articles along said path, the first of said conveyors being operative so to reduce the linear velocity of the articles that successive articles are brought substantially into contact; the second of said conveyors is so devised as further to reduce the linear velocity of the articles substantially to ¾ that of the velocity of articles as received by the first conveyor, and the guide means is so arranged as to define a path which gradually widens in such a manner, as the articles are moved by the second conveyor, that the articles automatically assume a relatively staggered relation with alternate articles engaging guides at opposite sides respectively of the path.

2. A divider according to claim 1, wherein a third conveyor is so constructed and arranged as to reduce the linear velocity of the articles to approximately ½ of that of the articles as they are received by the first conveyor, and guide means associated with the third conveyor defining a path which gradually increases to a width equal to slightly more than twice the diameter of the article being handled, whereby the articles automatically arrange themselves in two distinct parallel rows as they are moved along by the third conveyor, and successive articles in each of said parallel rows are in contact.

3. A divider according to claim 2, wherein at the delivery end of the third conveyor a fixed separator of triangular shape is arranged with its apex directed toward the space between the parallel rows of articles, and guide means which defines two divergent paths into which the articles of the respective rows are diverted by the separator.

4. A divider according to claim 1, wherein the path defined by the guide means first extends diagonally across the first conveyor and then at its delivery end portion becomes parallel to the direction of motion of the first conveyor.

5. A divider according to claim 2, wherein that part of the article path, defined by the guides and along which the articles are moved by the second conveyor, extends diagonally across the latter conveyor and then, at its delivery end portion, becomes parallel to the direction of motion of the second conveyor.

6. A divider according to claim 3, wherein that part of the article path, as defined by the guides along which the articles are moved by the third conveyor, and which is of a width to accommodate two rows of articles, extends diagonally across the latter conveyor and then, at its delivery end portion, where the articles are approaching the separator, becomes parallel to the direction of motion of the latter conveyor.

7. A divider according to claim 3, wherein independent conveyors are arranged to carry away the articles as they are diverted into separate paths by the separator.

8. A divider according to claim 7, wherein each independent conveyor moves at such a velocity as to space successive articles a predetermined distance apart.

9. A divider according to claim 1, wherein the linear velocity of the articles as they are delivered to the first conveyor is $(P^2+D^2)K^2$, where $P^2$ equals the spacing between adjacent articles, $D^2$ is the diameter of an article, and $K^2$ equals the number of articles per minute, and wherein the linear velocity of the second conveyor is approximately $D^2K^2$.

10. A divider according to claim 2, wherein the linear velocity of the second conveyor is $D^2K^2$, where $D^2$ equals the diameter of the article, $K^2$ equals the number of articles per minute, and the linear velocity of the third conveyor is $¾D^2K^2$.

11. A divider according to claim 3, wherein the linear velocity of the third conveyor is $¾D^2K^2$, where $D^2$ equals the diameter of the article, $K^2$ equals the number of articles per minute, and the linear velocity of the fourth conveyor is $½D^2K^2$.

12. A divider according to claim 9, wherein the value of $P^2$ equals ¼ inch.

References Cited in the file of this patent

UNITED STATES PATENTS

| | | |
|---|---|---|
| 1,551,614 | Paridon | Sept. 1, 1925 |
| 2,671,568 | Rundt | Mar. 9, 1954 |